United States Patent [19]
Higuchi et al.

[11] Patent Number: 5,624,079
[45] Date of Patent: Apr. 29, 1997

[54] INJECTION BLENDING OF TONER DURING GRINDING

[75] Inventors: Fumii Higuchi, Mississauga; Marsha A. Butler, Oakville, both of Canada

[73] Assignee: Xerox Corporation, Stamford, Conn.

[21] Appl. No.: 402,230

[22] Filed: Mar. 10, 1995

[51] Int. Cl.$^6$ .................................................. B02C 19/06
[52] U.S. Cl. ............................ 241/39; 241/41; 241/47
[58] Field of Search .......................... 241/1, 5, 18, 39, 241/47, 79.1, 41

[56] References Cited

U.S. PATENT DOCUMENTS

| | | | |
|---|---|---|---|
| 3,778,287 | 12/1973 | Stansfield et al. | 106/308 |
| 4,054,465 | 10/1977 | Ziobrowski | 106/298 |
| 4,304,360 | 12/1981 | Luhr et al. | 241/5 |
| 4,412,839 | 11/1983 | Taylor | 241/5 X |
| 4,894,308 | 1/1990 | Mahabadi et al. | 430/137 |
| 4,973,439 | 11/1990 | Chang et al. | 264/101 |
| 5,111,998 | 5/1992 | Kanda et al. | 241/5 |
| 5,435,496 | 7/1995 | Kanda et al. | 241/5 |

*Primary Examiner*—John M. Husar
*Attorney, Agent, or Firm*—John S. Wagley

[57] ABSTRACT

An apparatus for the mixing of toner and a material to form a toner mixture is provided. The apparatus includes a grinder having a grinding chamber within the grinder and a material adder for adding the material into the grinding chamber. The apparatus further includes a mixer for mixing the toner and the material within the grinding chamber to form the toner mixture.

16 Claims, 3 Drawing Sheets

INJECTION BLENDING OF TONER DURING GRINDING

The present invention relates to a method and apparatus for manufacturing toners. More particularly, the invention relates to apparatus and method for blending toners.

In the process of electrophotographic printing, a photoconductive surface has an electrostatic latent image recorded therein. Toner particles are attracted from carrier granules to the latent image to develop the latent image. Thereafter, the toner image is transferred from the photoconductive surface to a sheet and fused thereto.

Typically, polymer based toner is produced by melt-mixing the soft polymer and a pigment in an extruder, whereby the pigment is dispersed in the polymer. The polymer having the colorant dispersed therein is then pulverized. Further additives are added in a separate step subsequent to pulverization. The toner is much more difficult to transport in pipes after the pulverization step. While typically three colors, yellow, cyan and magenta are used in full process color xerography, a demand exists, particularly in high color copy machines for other colors as well as custom colors. Low volume color toner manufacturing using the extrusion process is very expensive.

The use of highlight color and full process color in electrophotographic printing has obviated the need for color toners. The colored toner typically have much smaller particle size, in the order of 4–10 microns. The smaller particle size makes the manufacturing of the toner more difficult with regard to material handling, classification and blending.

The following disclosures may be relevant to various aspects of the present invention:

U.S. Pat. No. 4,973,439

Patentee: Chang et al.

Issue Date: Nov. 27, 1990

U.S. Pat. No. 4,894,308

Patentee: Mahabadi et al.

Issue Date: Jan. 16, 1990

U.S. Pat. No. 4,054,465

Patentee: Ziobrowski

Issue Date: Oct. 18, 1977

U.S. Pat. No. 3,778,287

Patentee: Stansfield et al.

Issue Date: Dec. 11, 1973

U.S. patent application Ser. No. 08/247,821

Applicants: Proper et al.

Filing Date: May 23, 1994

The relevant portions of the foregoing disclosures may be briefly summarized as follows:

U.S. Pat. No. 4,973,439 (Chang et al.) discloses an apparatus for obtaining toner particles with improved dispersion of additive components therein comprised of a toner extrusion device containing therein a blending chamber, a mixing screw, a heater, a toner supply, and an injector for injecting additive components including charge control agents into the extrusion device enabling a decrease in the melting temperature of the toner resin particles contained therein.

In U.S. Pat. No. 4,894,308 (Mahabadi et al.), a process for preparing an electrophotographic toner is disclosed which comprises premixing and extruding a pigment, a charge control additive and a resin. The pigment and the charge control additive may be premixed prior to being added to the extruder with the resin; alternatively, the pigment and charge control additive may be premixed by adding them to the extruder via an upstream supply means and extruding them, and subsequently adding the resin to the extruder via a downstream supply means.

U.S. Pat. No. 4,054,465 (Ziobrowski) discloses lead chromate-containing pigments having improved dispersibility, heat stability and resistance to abrasion in thermoplastic systems. The pigments comprise silica coated lead chromate-containing particles having absorbed on their surface from 1–15% based on the weight of the coated particles of certain liquid organopolysiloxanes. The improved lead chromate-containing pigments of this invention are produced by depositing on the lead chromate-containing particles at least one substantially continuous coating of dense amorphous silica, with or without alumina, or a solid glass-like alkali polysilicate, and contacting the coated particles with certain liquid organopolysiloxanes. Following application of the silica coating to the lead chromate particles, the coated particles are contacted with a liquid organopolysiloxane under conditions which do not effect substantial polymerization a curing of the polysiloxane. The coated pigment can be in the form of a ground dried lump, a wet cake, a slurry of the coated pigment in water, or an inert organic diluent. The mixture is ground or vigorously agitated at room temperature in a blender. The liquid polysiloxane can also be applied directly, as by sprinkling on the dry coated pigment and then grinding wetted pigment in a high speed grinding device.

In U.S. Pat. No. 3,778,287 (Stansfield et al.) dispersions of inorganic pigments, lakes or toners in organic liquids containing polyesters dissolved therein having acid values up to 100 derived from certain hydroxy-containing, saturated or unsaturated aliphatic carboxylic acids are described. While liquid colorants offer the distinct advantage of being more readily incorporated into the medium to be colored than dry pigments, their commercial significance is seriously limited due to the problems of handling and storing potentially hazardous liquid chemicals. Thus, from an economic and safety standpoint, it is desirable to have the colorants in a dry, storage stable form which is readily dispersible in a wide variety of coating media without detriment to any of the desirable properties of coating produced therefrom.

U.S. patent application Ser. No. 08/247,821 (Proper et al.) now U.S. Pat. No. 5,468,586 discloses an apparatus for the preparation of a mixture of toner resin and a liquid colorant. The apparatus includes a toner extruder having the resin being conveyed therethrough and a colorant adder for adding the colorant to the toner resin in the toner extruder to form the toner mixture. The color of the extrudate is measured, compared to a standard and the amount of colorant added is modified accordingly.

In accordance with one aspect of the present invention, there is provided an apparatus for the mixing of toner and a material to form a toner mixture. The apparatus includes a grinder having a grinding chamber within the grinder and a material adder for adding the material into the grinding chamber. The apparatus further includes a mixer for mixing the toner and the material within the grinding chamber to form the toner mixture.

In accordance with another aspect of the present invention, there is provided a method for the mixing of a material with toner within a chamber of a grinder to form a toner mixture. The method includes the steps of depositing the toner into the chamber of the grinder, feeding the material into the chamber and blending the toner and the material to form the toner mixture.

The invention will be described in detail herein with reference to the following Figures in which like reference numerals denote like elements and wherein.

Figure 1:
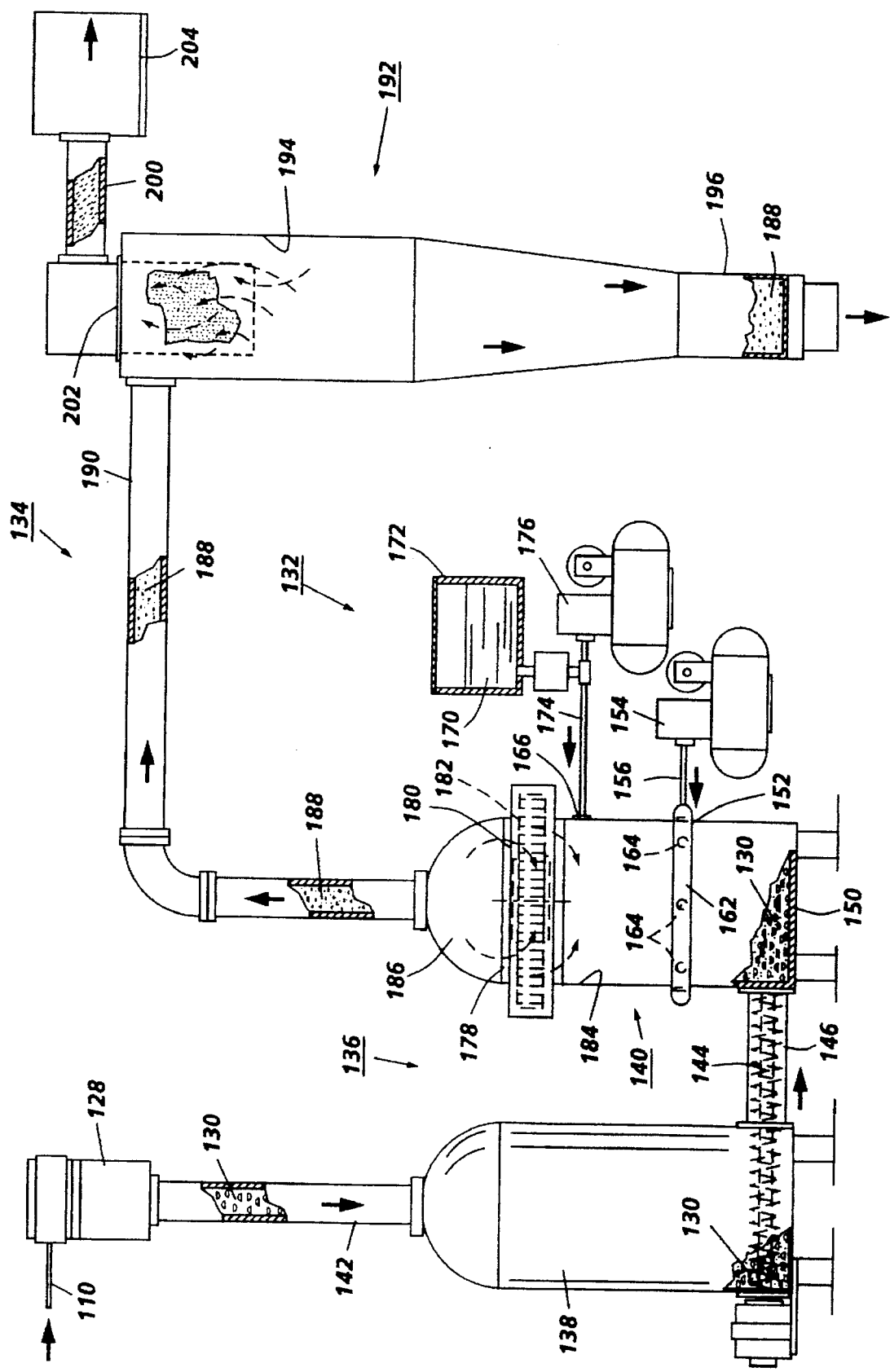
FIG. 1 is a schematic elevational view of a micronization system utilizing the additive injection system of the present invention.

According to the present invention, the toner created by the process of this invention comprises a resin, a colorant, and preferably a charge control additive and other known additives. The colorant is a particulate pigment, or alternatively in the form of a dye.

Numerous colorants can be used in this process, including but not limited to:

| Pigment Brand Name | Manufacturer | Pigment Color Index |
| --- | --- | --- |
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow TY-858-D | Heubach | Yellow 74 |
| Hansa Yellow X | Hoechst | Yellow 75 |
| Novoperm ® Yellow HR | Hoechst | Yellow 75 |
| Cromophtal ® Yellow 3G | Ciba-Geigy | Yellow 93 |
| Cromophtal ® Yellow GR | Ciba-Geigy | Yellow 95 |
| Novoperm ® Yellow FGL | Hoechst | Yellow 97 |
| Hansa Brilliant Yellow 10GX | Hoechst | Yellow 98 |
| Lumogen ® Light Yellow | BASF | Yellow 110 |
| Permanent Yellow G3R-01 | Hoechst | Yellow 114 |
| Cromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| L74-1357 Yellow | Sun Chem. | |
| L75-1331 Yellow | Sun Chem. | |
| L75-2377 Yellow | Sun Chem. | |
| Hostaperm ® Orange GR | Hoechst | Orange 43 |
| Paliogen ® Orange | BASF | Orange 51 |
| Irgalite ® 4BL | Ciba-Geigy | Red 57:1 |
| Fanal Pink | BASF | Red 81 |
| Quindo ® Magenta | Mobay | Red 122 |
| Indofast ® Brilliant Scarlet | Mobay | Red 123 |
| Hostaperm ® Scarlet GO | Hoechst | Red 168 |
| Permanent Rubine F6B | Hoechst | Red 184 |
| Monastral ® Magenta | Ciba-Geigy | Red 202 |
| Monastral ® Scarlet | Ciba-Geigy | Red 207 |
| Heliogen ® Blue L 6901F | BASF | Blue 15:2 |
| Heliogen ® Blue NBD 7010 | BASF | |
| Heliogen ® Blue K 7090 | BASF | Blue 15:3 |

-continued

| Pigment Brand Name | Manufacturer | Pigment Color Index |
| --- | --- | --- |
| Heliogen ® Blue K 7090 | BASF | Blue 15:3 |
| Paliogen ® Blue L 6470 | BASF | Blue 60 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | |
| Quindo ® Red R6713 | Mobay | |
| Indofast ® Violet | Mobay | Violet 23 |
| Monastral ® Violet Maroon B | Ciba-Geigy | Violet 42 |
| Sterling ® NS Black | Cabot | Black 7 |
| Sterling ® NSX 76 | Cabot | |
| Tipure ® R-101 | Du Pont | |
| Mogul L | Cabot | |
| BK 8200 Black Toner | Paul Uhlich | |

Any suitable toner resin can be mixed with the colorant by the downstream injection of the colorant dispersion. Examples of suitable toner resins which can be used include but are not limited to polyamides, epoxies, diolefins, polyesters, polyurethanes, vinyl resins and polymeric esterification products of a dicarboxylic acid and a diol comprising a diphenol. Any suitable vinyl resin may be selected for the toner resins of the present application, including homopolymers or copolymers of two or more vinyl monomers. Typical vinyl monomeric units include: styrene, p-chlorostyrene, vinyl naphthalene, unsaturated mono-olefins such as ethylene, propylene, butylene, and isobutylene; vinyl halides such as vinyl chloride, vinyl bromide, vinyl fluoride, vinyl acetate, vinyl propionate, vinyl benzoate, vinyl butyrate, and the like; vinyl esters such as esters of monocarboxylic acids including methyl acrylate, dodecyl acrylate, n-octyl acrylate, 2-chloroethyl acrylate, phenyl acrylate, methylalphachloroacrylate, methyl methacrylate, ethyl methacrylate, and butyl methacrylate; acrylonitrile, methacrylonitrile, acrylimide; vinyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl indole, N-vinyl pyrrolidene and the like; styrene butadiene copolymers, Pliolites, available from Goodyear Company, and mixtures thereof.

Particularly preferred are resins comprising a copolymer of styrene and butadiene which comprises 89 percent by weight of styrene and 11 percent by weight of butadiene, and a copolymer of styrene and n-butyl methacrylate which comprises 58% by weight of styrene and 42 percent by weight of n-butyl methacrylate.

The resin or resins are generally present in the resin-toner mixture in an amount of from about 50 percent to about 100 percent by weight of the toner composition, and preferably from about 80 percent to about 100 percent by weight.

Additional components of the toner may be added to the resin prior to mixing the toner with the additive. Alternatively, these components may be added during extrusion. Some of the additional components may be added after extrusion, such as the charge control additives, particularly when the pigmented toner is to be used in a liquid developer. These components include but are not limited to stabilizers, waxes, flow agents, other toners and charge control additives.

Various known suitable effective charge control additives can be incorporated into the toner compositions of the present invention, such as quaternary ammonium compounds and alkyl pyridinium compounds, including cetyl pyridinium halides and cetyl pyridinium tetrafluoroborates, as disclosed in U.S. Pat. No. 4,298,672, the disclosure of which is totally incorporated herein by reference, distearyl dimethyl ammonium methyl sulfate, and the like. Particularly preferred as a charge control agent is cetyl pyridinium chloride. The charge enhancing additives are usually present in the final toner composition in an amount of from about 1 percent by weight to about 20 percent by weight.

Other additives may also be present in toners obtained by the process of the present invention. External additives may be applied, for example, in instances such as when toner flow is to be assisted, or when lubrication is needed to assist a function such as cleaning of the photoreceptor. The amounts of external additives are measured in terms of percentage by weight of the toner composition, but are not themselves included when calculating the percentage composition of the toner. For example, a toner composition containing a resin, a colorant, and an external additive may comprise 80 percent by weight resin and 20 percent by weight colorant; the amount of external additive present is reported in terms of its percent by weight of the combined resin and colorant.

External additives may include any additives suitable for use in electrostatographic toners, including fumed silica, silicon derivatives such as Aerosil® R972, available from Degussa, Inc., ferric oxide, hydroxy terminated polyethylenes such as Unilin®, polyolefin waxes, which preferably are low molecular weight materials, including those with a molecular weight of from about 1,000 to about 20,000, and including polyethylenes and polypropylenes, polymethylmethacrylate, zinc stearate, chromium oxide, aluminum oxide, titanium oxide, stearic acid, polyvinylidene fluorides such as Kynar, and other known or suitable additives. External additives may be present in any amount, provided that the objectives of the present invention are achieved, and preferably are present in amounts of from about 0.1 to about 1 percent by weight. For the process of the present invention, these additives may preferably be introduced onto the toner particles after mixing with the colorant and subsequent pulverization and classification.

Figure 2:
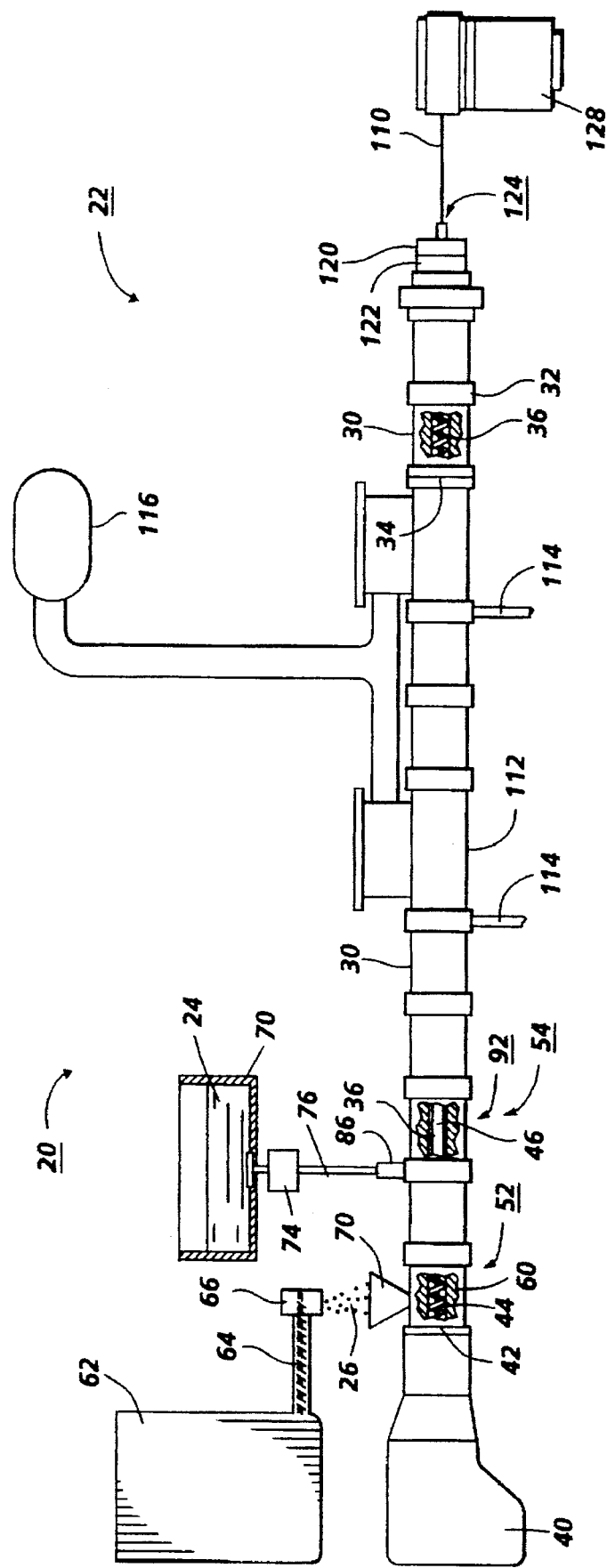
FIG. 2 is a schematic elevational view of an extruder for use with the micronization system of FIG. 1.

A toner composition may be manufactured by any known method, but preferably is manufactured by an extrusion process on an extruder. Such an extruder is shown in FIG. 2. Referring now to FIG. 2, an extruder system 20 is shown. The extruder system 20 includes an extruder 22 for mixing colorant 24 with dry resin 26 and for converting the dry resin 26 into a liquid form. Generally, any extruder, such as a single or twin screw extruder, suitable for preparing electrophotographic toners, may be employed for mixing the colorant 24 with the resin 26. For example a Werner Pfleiderer WP-28 extruder equipped with a 15 horsepower motor is well-suited for melt-blending the resin 26, a colorant 24, and additives. This extruder has a 28 mm barrel diameter, and is considered semiworks-scale, running at peak throughputs of about 3 to 12 lbs./hour. A typical extruder 22 includes a series of interconnected housings 30. The housings 30 are interconnected by flanges 32 at ends 34 of the housings 30. Feed screws 36 are located within the housings 30. Each housing 30 may have a solitary screw 36 or the housings 30 may include a pair of screws 36.

Again referring to FIG. 2, a power source 40, preferably in the form of an electric motor, is located on an end 42 of the extruder 22. The motor 40 serves to rotate the screws 36, each of the screws 36 being mechanically connected to the motor 40. The screws 36 may be in the form a spiral feed screw 44 for propelling the resin 26 and colorant 24 through the extruder 22 or in the form of kneading screws having either no spiral or a reverse spiral which are used to disperse the other constituents including the colorant 24 into the resin 26. The screws 36 thus within each housing 30 are either of a spiral screw 44 or of a mixing screw 46. Each of the housings 30 thus form zones. In a preferred twin screw extruder, there are specific zones along the entire length of the extruder 22 which may be the same or different for each section 30. The zones may include feed zones 52 and mixing zones 54 with each feed zone 52 having at least one feed screw 44 and with each mixing zone 54 having at least one mixing screw 46. In the feed zone 52, resin 26 is metered into the extruder 22. The temperature is maintained below the resin melt point. If the resin begins to melt at the feed port, the entry clogs, and the extruder 22 often stalls.

At a first feed zone 60, the resin 26 is added to the extruder 22. The resin 26 is stored adjacent the extruder 22 in a dry toner resin feeder hopper 62. The resin 26 is uniformly fed from the hopper 62 by an auger 64 to a resin hopper outlet 66. The resin hopper outlet 66 is located adjacent a extruder resin inlet 70 into which the resin 26 is deposited.

After the resin 26 is added to the extruder 22, the colorant 24 is added to the extruder 22. The resin 26 may travel through one or more of the feed zones 52 before entering the area where the colorant 24 is added. The colorant 24 is preferably stored in a separate container such as a colorant tank 70. The colorant 24 at this stage may be either a dispersion of pigment in liquid, a solution of dye or a colorant in a melted state. To accommodate the caustic nature of the colorant solution, the tank 70 is preferably made of stainless steel or contains a glass liner (not shown). The tank 70 may be portable and may include rollers (not shown) to ease the movement of the tank 70. A first conduit 76 interconnects the tank 70 to the extruder 22. The first conduit 76 is preferably in the form of non-corrosive tubing, such as stainless steel tubing.

The first conduit 76 connects pump 74 to an injection nozzle 86 in the extruder 22. The colorant 24 within the injection nozzle 86 then enters a high intensity mixing zone 92.

As the colorant 24 is mixed with resin 26, an extrudate 110 is formed which contains the colorant 24 evenly distributed within the resin 26. The mixing screws 46 are preferably turned at the fastest rate which allows the molten resin to achieve the desired temperatures. Faster screw speeds provide higher energy mixing and greater throughputs, but above a certain rate, the resin 26 is moving too fast to equilibrate with the barrel temperature, and dispersion quality degrades.

The extrudate 110 passes from the high intensity mixing zone 92 to the next adjoining zone. The next adjoining zone may be one of the feed zones 52 or one of the mixing zones 54. The extrudate 110 next preferably passes an evaporation zone 112 where conduit 114 passes water into the extruder 22. Due to the heat generated in the high intensity mixing zone 92, the temperature of the extrudate 110 in the evaporating zone 112 is preferably significantly above 100° C. and therefore the water which is added by the conduit 114 to the evaporation zone 112 evaporates into steam which is drawn from the evaporation zone by a vacuum port 116. Along with the steam leaving through the vacuum port 116 are volatile chemicals (not shown) which are likewise drawn from the extruder at the vacuum port 116. The extrudate continues to pass through the extruder 22 to a die plate 120 located at an outlet 122 of the extruder 22. The die plate 120 includes an aperture 124 or multiple apertures through which the extrudate 110 exits the extruder 22. At the die plate 120, the temperature is raised from approximately 110° C. to above 200° C. temperature to obtain a temperature which fluidizes the extrudate and causes it to flow freely through the aperture 124. The pressure in the preceding mixing zone can be increased by restricting the size of the aperture 124, at the expense of throughput. The aperture 124 is chosen of suitable size to provide flow sufficient to provide for a commercially acceptable process.

The extrudate 110 from the extruder 22 is cooled by spray or immersion in water prior to cutting the strands with a rotary knife or other suitable means. For example, a rotary cutter 128, such as an Alpine® Cutter or Fitz® Miller, may be used to reduce the size of the resin particles. The rotary cutter 128 cuts the extrudate 110 into pellets 130.

After the resin has been extruded, the resin mixture is reduced in size by any suitable method including those known in the art. An important property of toners is brittleness which causes the resin to fracture when impacted. This allows rapid particle size reduction in attritors, other media mills, or even jet mills used to make dry toner particles. It should be appreciated that the particle size reduction may possibly include the use of a pulverizer (not shown). The pulverizer may be a hammer mill such as, for example, an Alpine® Hammer Mill. The hammer reduces the toner particles to a size of about 100 μm to about 300 μm. Applicants have found that the invention may be practiced without the use of the hammer mill.

Figure 3:
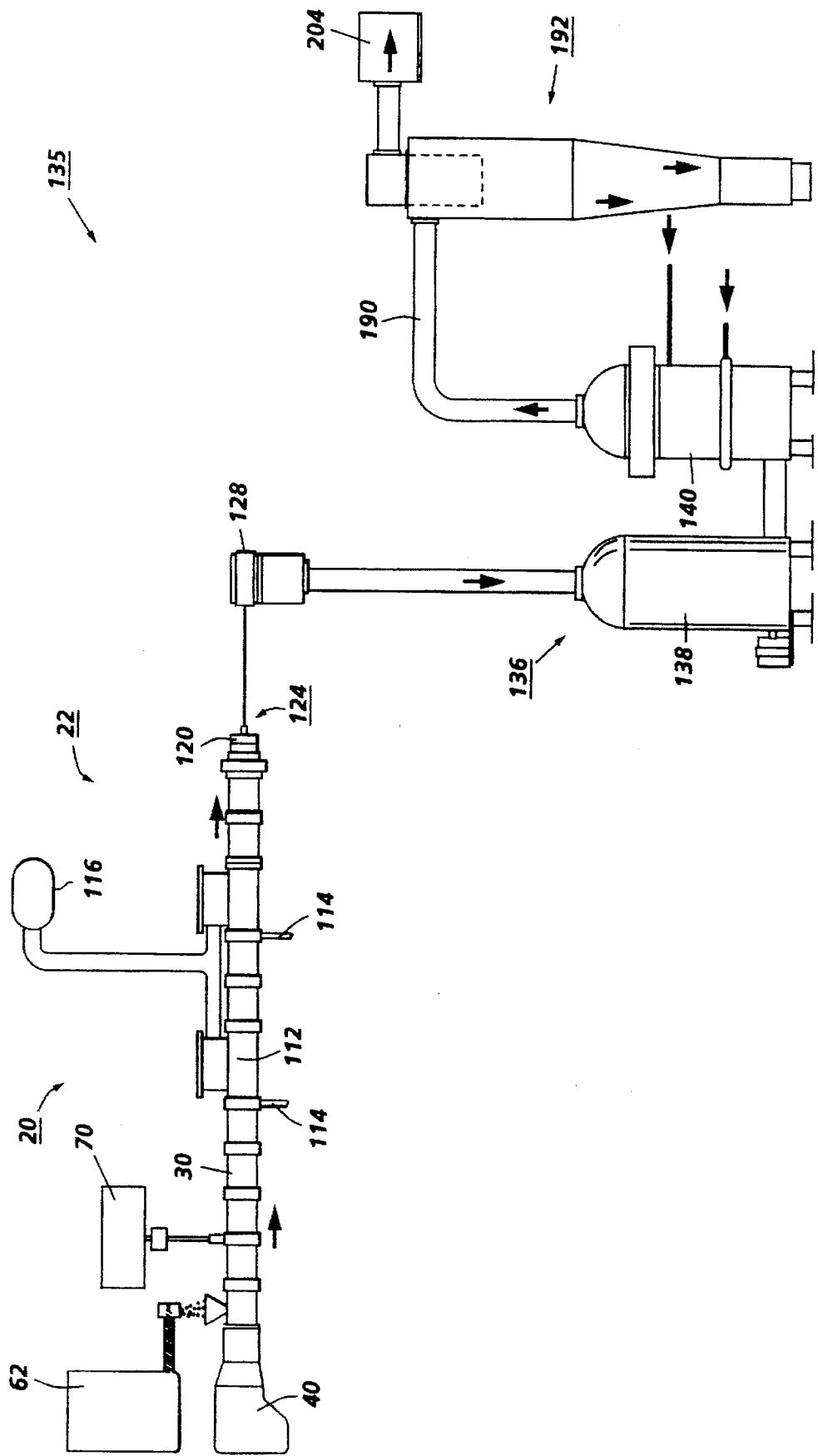
FIG. 3 is a schematic elevational view of a toner manufacturing system including the micronization system of FIG. 1 and the extruder of FIG. 2.

According to the present invention and referring to FIG. 3, an additive injection blender 132 according to the present invention is shown as part of a micronization system 134. The micronization system 134 serves to reduce the particle size of the pellets 130 into toner particles of an appropriate size, such as four to eight microns. The micronization system 134 is connected to the extruder system 20 to form a toner manufacturing system 135.

As earlier stated, an important property of toners is brittleness, which causes the resin to fracture when impacted. This allows rapid particle size reduction in aerators, other media mills, or even jet mills to make dry toner particles.

The micronization system 134 preferably includes a micronizer 136 which provides for the rapid particle size reduction of the pellets 130 into toner particles. Preferably, the micronizer is a jet-type micronizer such as a jet mill. Jet mills containing a milling section into which water vapor jets or air jets are blown at high speeds and the solid matter to be micronized is brought in across an injector by a propellant. Compressed air or water vapor is usually used as the propellant in this process. The introduction of the solid matter into the injector usually occurs across a feeding hopper or entry chute.

For example, the micronizer 136 may be a Sturtevant 15 inch jet mill having a feed pressure of about 114 psi and a grinding pressure of about 119 psi may be used in the preparation of the toner resin particles. The nozzles of this jet mill are arranged around the perimeter of a ring. Feed material is introduced by a pneumatic delivery device and transported to the injector nozzle. The particles collide with one another and are attrited. These particles stay in the grinding zone by centrifugal force until they are small enough to be carried out and collected by a cyclone separator. A further size classification may be performed by an air classifier.

Preferably, however, the micronizer 136 is in the form of an AFG-800 grinder. The AFG-800 grinder is a fluidized air mill made by AFG(Alpine Fliebbertt-Gegenstrahlmuhle). The micronizer 136 is shown in greater detail in FIG. 1. The micronizer includes a feed chamber 138 and a grind chamber 140. A pipe or tube 142 connects the rotary cutter 128 with the feed chamber 138. The pipe 142 is made of any suitable durable material which is not interactive with the toner composition, such as stainless steel. The pellets 130 are propelled toward the feed chamber 138 by any suitable means such as by augers (not shown) or by blowers (not shown). The pellets 130 accumulated in the feed chamber 138 are extracted from the feed chamber 138 by a screw 144 located in a tube or pipe interconnecting the feed chamber 138 with the grind chamber 140. The screw 144 and the pipe 146 are made of any suitable durable material which is not chemically interactive with the toner, such as stainless steel. The pellets 130 enter lower portion 150 of the grind chamber 140.

Compressed air is added to the grind chamber 140 in a lower central portion 152 of the grind chamber 140. The compressed air is supplied by any suitable compressed air source 154, such as an air compressor. Compressed air conduit 156 interconnects the compressed air source with a ring 162 located around the grind chamber 140. Extending inwardly from the ring 162 are a series of inwardly pointing nozzles 164 through which the compressed air enters the grind chamber 140. The compressed air causes the pellets 130 to accelerate rapidly upwardly within the grind chamber 140.

Located above the ring 162 is an additive inlet 166 through which external additive 170 is added to the grind chamber 140. The external additive 170 is stored within a external additive container 172. The external additive container 172 is connected to the grind chamber 140 by conduit 174. The conduit 174 and the container 172 are made of any suitable durable material which is not interactive with the toner, such as a stainless steel. A second air source 176 which may be separate from or integral with the first air source 154 is connected to the conduit 174 and/or the container 172. The second air source 176 provides propulsion for the additive 170 into the grind chamber 140. The additive 170 enters the grind chamber 140 above the ring 162. The rapid air flow from the nozzles 164 causes the additive 170 as well as the pellets 130 to move rapidly upwardly into upper portion 178 of the grind chamber 140.

In the upper portion 178 of the grind chamber 140 a series of rotating classifier wheels 180 set the toner air mixture into rapid rotation. The classifier wheels 180 include fins 182 along the periphery of the classifier wheels 180. The wheels 180 cause the larger particles, pellets 130, to be propelled to inner periphery 184 of the grind chamber 140 and to return to the lower portion 150 of the grind chamber 140. The pellets 130 impact each other and the components of the micronizer 136 and thereby micronize the toner into micronized toner 188. The micronized toner 188, on the other hand, is permitted to move upwardly within the grind chamber 140 into manifold 186.

A long connecting pipe 190 is connected on one end thereof to manifold 186 and on the other end thereof to a product cyclone 192. The long connecting pipe 190 serves to provide a conduit between the grind chamber 140 and the product cyclone 192 for the micronized toner 188. The pipe 190 also provides increased mixing between the additive 170 and the micronized toner 188. The long connecting pipe 190 may be of any suitable durable material, such as stainless steel.

The product cyclone 192 is designed to separate particles from the air stream in which they are carried. A product cyclone may be any suitable commercially available cyclone manufactured for this purpose and may, for example, include a (quad) cyclone which consists of four cyclones combined. Within the product cyclone 192, the micronized toner 188 circulates in a spinning manner about inner periphery 194 of the cyclone 192. The larger micronized toner 188 has a greater mass and is thereby propelled to the inner periphery 194 of the cyclone 192, falling into the lower portion 196 of the product cyclone 192. Most of the additive 170 is coated to or adheres to the surface of the micronized toner 188. Air and very small dust particles 200 having a lesser mass and a particle size of, perhaps, less than 1 microns are, in contrast, drawn upwardly through upper opening 202 of the cyclone 192 into dust collector 204. The micronized toner 188 collects in the lower portion 196 of the cyclone 192 and is extracted therefrom.

It should be appreciated that while the additives 170 were added in the grind chamber 140 between the nozzles 164 and and the classifier wheels 180, the additives could be alternatively added somewhat earlier or somewhat later in the process.

Preferably, the additives 170 are in a substantially dry form in order that the micronized toner 188 and the additives 170 may be blended without forming agglomerates. The applicants are uncertain as to the maximum moisture content permitted in the additives 170 for this process.

The additive injection system of the present invention provides for cost and investing savings by negating the need for the step of separately adding and mixing the micronized toner with the external additives and related equipment therefore.

The additive injection system of the present invention further provides for much improved flow of the pulverized toner, greatly reducing the clogging of micronized toner occurring after the micronizing of the toner.

The combination of micronizing the toner simultaneously with blending the additive to the toner provides for a more efficient blending of the toner and the additive in that the additive provides for a more efficient flow of the toner and thus a more efficient and complete blending of the toner with the additives.

The adding of external additives in the grind chamber will permit the external additives in the form of color toner of other colors to be blended with the toner in the grind chamber to form different and/or special colors.

It should be appreciated that other methods may be used to reduce the size of the toner, including methods that may be applied when the toner will be used to form a liquid developer. Such methods include, for example, post-processing with an attritor, vertical or horizontal mills or even reducing toner particle size in a liquid jet interaction chamber. Additives such as charge control agents may be added to the liquid developer.

While the invention has been described with reference to the structures and embodiments disclosed herein, it is not confined to the details set forth, and encompasses such modifications or changes as may come within the purpose of the invention.

We claim:

1. An apparatus for the mixing toner having a first composition and a material having a second composition substantially different from the first composition to form a toner mixture, comprising:

a grinder defining a grinding chamber for receiving therein a supply of toner having the first composition and the material having a second composition;

means for adding the material into the grinding chamber;

means for adding the toner into the grinding chamber; and means for mixing the toner and the material within the grinding chamber to form the toner mixture.

2. The apparatus of claim 1:

wherein said grinder comprises a fluidized bed grinder; and wherein said toner adding means comprises a feed chamber coupled to the grinding chamber.

3. The apparatus of claim 1, wherein said material adding means comprises:

a material container;

a conduit connecting said container to the grinding chamber; and a material transporter operably associated with said container and said conduit to urge the material along said conduit.

4. The apparatus of claim 3, wherein said material transporter comprises a compressed air source.

5. The apparatus of claim 4, wherein said compressed air source is connected to said container by said conduit so as to form a stream of air into the chamber with the material at least partially mixed therewith.

6. The apparatus of claim 5, further comprising a nozzle connected to said conduit adjacent said grinder to direct the stream of air.

7. The apparatus of claim 1, wherein said mixing means comprises:

a compressed air source for providing a stream of air; and a conduit connecting said air source to the grinding chamber.

8. The apparatus of claim 7, wherein said mixing means further comprises a nozzle connected to said conduit adjacent said grinder to direct the stream of air.

9. The apparatus of claim 7, wherein said adding means comprises:

a material container;

a second conduit connecting said container to the grinding chamber; and a material transporter operably associated with said container and said second conduit to urge the material along said second conduit.

10. The apparatus of claim 9, wherein said material transporter comprises a second compressed air source.

11. The apparatus of claim 10, wherein said first compressed air source and said second compressed air source are integral.

12. The apparatus of claim 1 wherein said grinder comprises:

an inlet connected to a first end of the chamber; and an outlet connected to a second end of the chamber, the toner and the material flowing toward the outlet.

13. The apparatus of claim 12 wherein said adding means is located between said mixing means and said outlet.

14. An apparatus for mixing toner having a first composition and a material having a second composition substantially different from the first composition to form a toner mixture, comprising:

a grinder defining a grinding chamber for receiving therein a supply of toner having the first composition and the material having a second composition;

means for adding the toner into the grinding chamber;

means for adding the material into the grinding chamber, said toner adding means being distinct from said material adding means; and means for mixing the toner and the material within the grinding chamber to form the toner mixture.

15. The apparatus of claim 14, wherein said toner adding means comprises:

a toner supply source; and a feed chamber interconnecting said toner supply source to the grinding chamber of said grinder.

16. The apparatus of claim 15, wherein said material adding means comprises:

a material container;

a conduit connecting said container to the grinding chamber; and a material transporter operably associated with said container and said conduit to urge the material along said conduit.

\* \* \* \* \*